Aug. 18, 1925.
S. P. PETERSON
1,550,633
PEDAL HOLDER
Filed Aug. 12, 1924
2 Sheets-Sheet 1
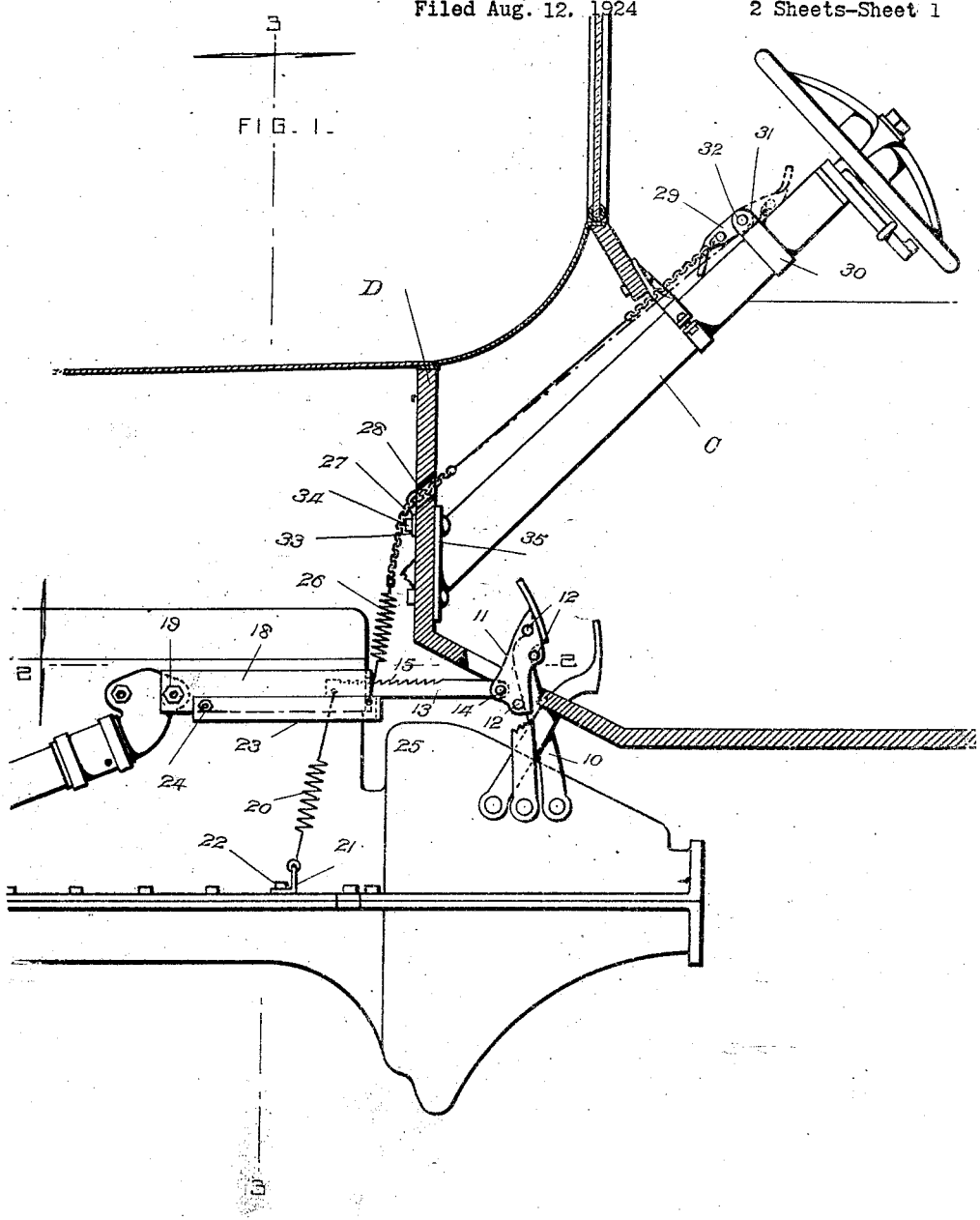
Inventor:
SILAS P. PETERSON, Aug. 18, 1925.
S. P. PETERSON
PEDAL HOLDER
Filed Aug. 12, 1924
1,550,633
2 Sheets-Sheet 2
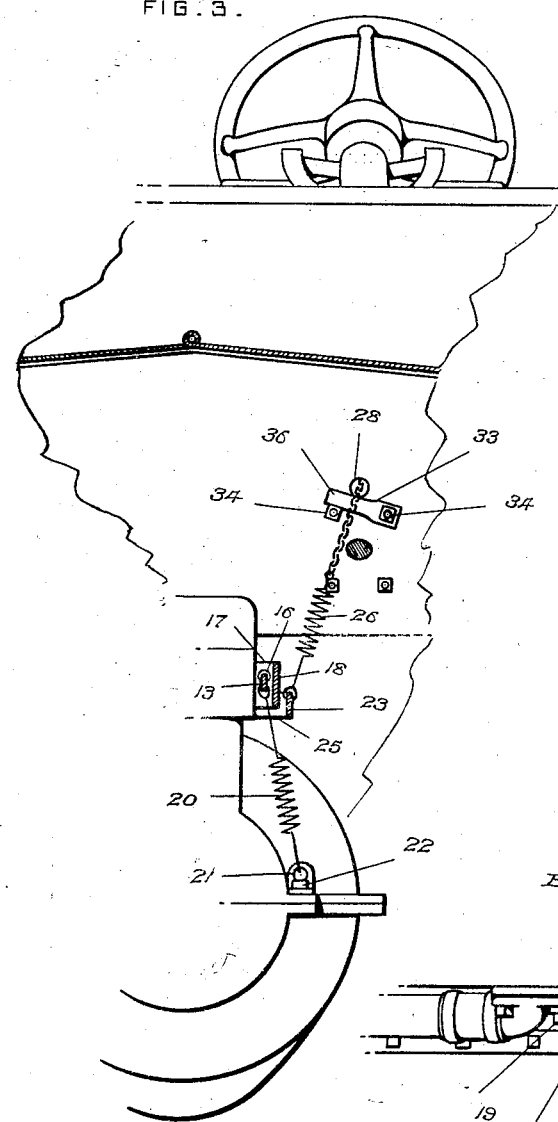
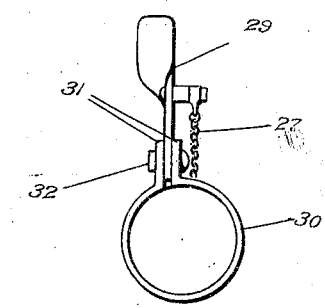
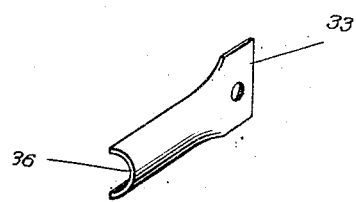
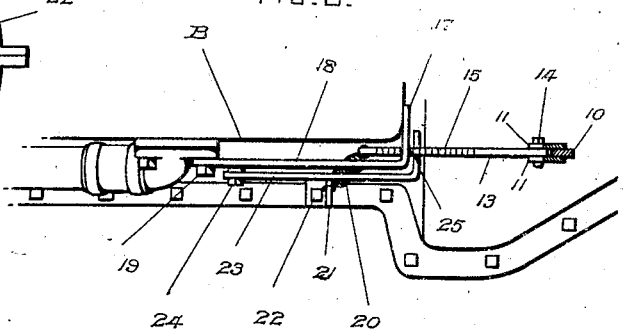
Inventor
SILAS P. PETERSON
By Monroe E. Miller
Attorney.

Patented Aug. 18, 1925.

1,550,633

UNITED STATES PATENT OFFICE.

SILAS P. PETERSON, OF MANLIUS, ILLINOIS.

PEDAL HOLDER.

Application filed August 18, 1924. Serial No. 731,582.

*To all whom it may concern:*

Be it known that I, SILAS P. PETERSON, a citizen of United States, residing at Manlius, in the county of Bureau and State of Illinois, have invented certain new and useful Improvements in Pedal Holders, of which the following is a specification, reference being had therein to the accompanying drawing.

The present invention relates to pedal holders, and aims to provide a novel and improved device for holding a foot pedal of an automobile or motor truck when same has been pushed by the foot, so as to prevent the pedal from returning until the holding device is operated to release the pedal, although the foot has been removed from the pedal.

Another object is the provision of such a device comprising a novel construction and assemblage of the component elements, whereby the device can be readily applied or installed, and to render the device practical and efficient in use.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Fig. 1 is a side elevation showing the device as installed, portions of the automobile being shown in section.

Fig. 2 is a horizontal section on the line 2—2 of Fig. 1 showing portions of the device in plan.

Fig. 3 is a front view showing the device, portions being shown in section taken on the line 3—3 of Fig. 1.

Fig. 4 is a perspective view of the guide member for the chain or cable.

Fig. 5 is an elevation of the chain or cable pulling lever and its supporting clamp.

The device may be used for holding the brake pedal of an automobile or motor truck, when it is desired to keep the foot brake applied, such as when standing on a hill, and the device can also be used on the clutch pedal or other foot pedal when it is desired to hold the clutch open or to keep the corresponding foot pedal from returning when pushed by the foot.

As shown, the device is applied to the foot pedal 10 by means of a pair of plates 11 disposed at opposite sides of said pedal and clamped to said pedal by the bolts or securing elements 12 extending through said plates at the opposite edges of the pedal.

A ratchet bar 13 has its rear end pivoted, as at 14, between the plates 11, thereby pivotally connecting said bar with the pedal, so that said bar is moved forwardly and rearwardly with the pedal. Said bar has the ratchet teeth 15 in its upper edge.

The bar 13 is slidable through a slot 16 in the rear end portion 17 of a bar 18, said end portion 17 being bent at an angle to bear against the rear end of the cylinder block B of the engine. The forward terminal of the bar 18 is apertured to engage one of the bolts 19 which secure the return hose connection to the cylinder block. Thus, the single bolt 19 serves to attach the bar or member 18 to the engine block. When the bar 13 seats on the lower end of the slot 16 the bar is slidable freely forwardly and rearwardly, but when the bar is lifted, the notches 15 engage the portion 17 at the upper end of the slot 16, to prevent the rearward movement of the pedal 10.

A coil spring 20 has its upper end engaged through an aperture in the bar 13 near the forward end of said bar, and the lower end of the spring is anchored to the engine. As shown, the lower end of the spring engages an angle piece 21 secured by one of the crank casing bolts 22. The spring 20 pulls the forward end of the bar 13 down, to disengage the notches 15 from the holding bar or member 18.

In order to lift the bar 13 to holding position, a bar or arm 23 is disposed at the outer side of the bar 18, and has its forward end pivotally connected, as at 24, with the bar 18, so that the arm or bar 22 can swing upwardly and downwardly. The rear terminal 25 of the bar 23 is bent at an angle to extend under the ratchet bar 13, whereby the ratchet bar 13 will be lifted by the terminal portion or finger 25 when the arm or bar 23 is raised.

The ratchet bar 13 is under manual control, for holding and releasing the pedal 10 at will. Thus, a coil or elastic spring 26 is connected to the arm 23 and to a chain, cable or other flexible element 27 which passes through a hole 28 in the dash D above the steering column C, and said flexible element extends upwardly and rearwardly above said column and is connected to a lever 29. Said lever is pivotally mounted on the steering column by means of a band or clamp 30 embracing the column and having outstanding terminals or ears 31 through which a clamping bolt 32 engages for clamping the band on the column. The lever 29 is pivoted between the ears 31 on the bolt 32.

In order to guide the chain or flexible element 27 through the aperture or hole 28, a plate 33 is apertured near one end to engage one of the bolts 34 which clamp the plate or support 35 for the steering column to the dash, and said plate 33 extends under the hole 28 and rests on the companion bolt 34, as clearly seen in Fig. 3. The plate 33 is convexed transversely so as to present a rounded surface over which the chain or flexible element 27 passes through the hole 28, thereby reducing friction and wear.

When the lever 29 is swung forwardly and downwardly, as seen in full lines in Fig. 1, the chain or flexible element 27 is slackened, as well as the spring 26, so that the spring 26 swings the ratchet bar 13 downwardly. Said ratchet bar will therefore slide forwardly and rearwardly without catching when the pedal 10 is oscillated. When it is desired to hold the pedal 10 when pushed forwardly by the foot, the lever 29 is swung upwardly and rearwardly to the dotted line position as seen in Fig. 1. The flexible element 27 is therefore pulled rearwardly and upwardly, to stretch the spring 26, and the tension of the spring 26 will therefore overcome the tension of the spring 20. Consequently, the arm 23 is raised, and the finger 25 thereof will raise the ratchet bar 13 against the upper end of the slot 16. As a result, when the pedal 10 is pushed forwardly, the ratchet teeth 15 will snap past the portion 17, and will catch said portion to prevent the rearward return of the pedal 10. If the pedal 10 controls the service brake, then the brake will be held applied, and if the pedal controls the clutch, the clutch will be held open. When it is desired to release the pedal 10, the lever 29 is simply swung upwardly and forwardly, thereby slackening the flexible element 27 and spring 26, so that the spring 20 swings the ratchet bar 13 downwardly, thereby releasing said ratchet bar and pedal, and the pedal will return rearwardly at once.

The device is simple, the parts thereof being readily manufactured at small cost, and the device can be readily installed. The parts can be of different sizes for application to different automobiles and motor trucks.

Having thus described the invention, what is claimed as new is:—

1. A device of the character described comprising a ratchet bar having means for pivotally connecting it with a pedal, a member in which said ratchet bar is slidable to be engaged by the teeth of said bar, an arm pivotally connected with said member and having a portion to engage said bar for controlling the swinging movement of said bar into and out of locking engagement with said member, and controlling means connected to said arm.

2. A device of the character described comprising a ratchet bar having means for pivotally connecting it with a pedal, a member in which said ratchet bar is slidable to be engaged by the teeth thereof, spring means connected to said bar for swinging same to disengage the teeth thereof from said member, an arm pivotally connected with said member and having a portion to engage said bar for swinging the bar to engage the teeth thereof with said member, and controlling means connected with said arm for swinging it.

3. A device of the character described comprising a ratchet bar having means for pivotally connecting it with a pedal, a bar to be secured to an engine having an angularly extending bent portion provided with a slot through which said ratchet bar is slidable for the engagement of said portion by the teeth of the ratchet bar, an arm pivotally connected with the second named bar and having a finger extending across the ratchet bar for swinging the ratchet bar in one direction with said arm, means for swinging said ratchet bar in the opposite direction, and controlling means connected to said arm for swinging it.

4. A device of the character described comprising a ratchet bar having ratchet teeth in its upper edge, and having means for pivotally connecting the bar with a pedal, a bar attachable to an engine and having an angularly extending portion provided with a slot through which said ratchet bar is slidable for the engagement of said teeth with said portion when the ratchet bar is raised, spring means for swinging the ratchet bar downwardly, an arm pivotally connected to the second named bar and having an angularly extending finger projecting below the ratchet bar, and controlling means connected to said arm for raising it.

In testimony whereof I hereunto affix my signature.

SILAS P. PETERSON.